United States Patent
Bower

[15] 3,664,389
[45] May 23, 1972

[54] LATERAL ADJUSTMENT MEANS FOR RADIAL ARM SAWS

[72] Inventor: Exil E. Bower, 1430 West 4th Place, Mesa, Ariz. 85201

[22] Filed: June 1, 1970

[21] Appl. No.: 41,871

[52] U.S. Cl. .............................................................143/6 A
[51] Int. Cl............................................................B27b 5/28
[58] Field of Search............................143/6 A, 6 B, 6 C, 6 D; 33/164 R

[56] References Cited

UNITED STATES PATENTS

| 2,989,094 | 6/1961 | Panavas | 143/6 A |
| 2,047,887 | 7/1936 | Robillard | 33/164 R |
| 3,023,792 | 3/1962 | Palmer et al. | 143/6 C |
| 3,192,816 | 7/1965 | Zimmerman | 143/6 A X |

Primary Examiner—Andrew R. Juhasz
Assistant Examiner—James F. Coan
Attorney—William H. Dean

[57] ABSTRACT

A lateral adjustment means for radial arm saws comprising an elongated traverse rod precisely axially adjustable in a longitudinal direction relative to the radial arm of a radial arm saw and means fixed to the carriage of a respective radial arm saw adapted to traverse said traverse rod longitudinally thereof and means for releasably fixing said last mentioned means to said traverse rod.

7 Claims, 4 Drawing Figures

PATENTED MAY 23 1972

INVENTOR.
EXIL E. BOWER

BY
Drummond, Cahill & Phillips
ATTORNEYS

INVENTOR.
EXIL E. BOWER
BY
Drummond, Cahill & Phillips
ATTORNEYS

LATERAL ADJUSTMENT MEANS FOR RADIAL ARM SAWS

Conventional radial arm saws are provided with radial arms which are supported in cantilever position so as to suspend a circular saw therefrom. The circular saw is a power operated saw generally driven by an electric motor which is pivoted about a vertical axis in connection with a carriage which traverses longitudinally along the radial arm. Accordingly, the circular saw rotates on a horizontal axis and may be pivoted about a vertical axis in connection with the carriage in order to dispose the rotating axis of the saw generally parallel to the radial arm or at right angles thereto for disposing the saw blade in a ripping position or a respective cross-cut position as desired.

Conventional radial arm saws generally employ a manually operable means for fixing the carriage of a radial arm saw in certain adjusted position relative to the radial arm for holding the plane of the circular saw in a desired position for ripping boards or other material. It has been found in actual practice that the movement of the carriage relative to the radial arm may be difficult to control precisely in order to obtain a very accurate disposition of the plane of the saw relative to the work. Generally, the adjustment of the saw blade laterally relative to the plane thereof, has been difficult due to the fact that the rollers of the carriage may contact particulate matter such as saw dust or the like in the track on the radial arm and tend to cause the carriage and saw blade to lunge an undesirable distance in a direction laterally relative to the plane of the circular saw blade. Accordingly, it has been difficult precisely to adjust such saw blades on radial arm saws to a desired ripping position so that very accurate work may be accomplished. The conventional means for holding a radial arm saw carriage in a certain position with respect to the longitudinal axis of the radial arm comprises a conventional screw-threaded member which may be manually tightened with respect to a fixture on the carriage so that a brake shoe may be locked against a corresponding brake shoe track extending longitudinally along the radial arm.

Accordingly, operators of conventional radial arm saws waste considerable time attempting to attain precise adjustment of the circular saw blade of such saws laterally relative to the planes of said blades for accomplishing precise ripping operations. This has not only utilized considerable time but also has been responsible for inaccurate work and possible damage to materials being ripped due to inaccurate location of the cut made by the saw.

In accordance with the present invention, a lateral adjustment means for radial arm saws permits the operator to make very accurate adjustments of the saw blade laterally relative to its plane of rotatation for attaining very accurate ripping operation of the saw with respect to material being sawed thereby.

The invention employs a very simple mechanism which may be attached to conventional radial arm saws without undue alteration thereto and which may be very simply and easily used by the operator of a radial arm saw. Additionally, the invention does not hamper the normal operation of the carriage of a radial arm saw relative to the radial arm during cross-cut sawing operations which are carried on by moving the carriage back and forth longitudinally the radial arm.

Specifically, the invention comprises a traverse rod having a means holding it precisely in connection with the radial arm of a radial arm saw so that the traverse rod may be adjusted longitudinally of its axis in a very precise manner, and means on the carriage of the radial arm saw is adapted to be releasably fixed to the traverse rods at various desired positions to maintain an approximate disposition of the saw blade relative to a ripping position. The adjustment means of the invention is then used to move the traverse rod precisely in a direction longitudinally of its axis to thereby precisely move the saw blade in a direction laterally of its plane of rotation to an exact position for attaining accurate ripping operations thereof.

The conventional brake shoe actuating means of a radial arm saw may be utilized in accordance with the present invention for fixing the radial arm saw carriage relative to the traverse rod of the invention thereby making the invention readily adaptable to conventional radial arm saws.

The invention comprises a very simple bracket which may be attached to a radial arm saw to hold a traverse rod of the invention in parallel relation to the radial arm of a radial arm saw; the bracket being adapted to provide a rotary bearing support for holding an internally screw-threaded adjusting sleeve precisely in position relative to the longitudinal axis of the traverse rod and to permit rotation of the sleeve in relation to external screw threads on the rod so that the rod may be precisely moved longitudinally of its axis by rotation of the sleeve. The sleeve is provided with dimensional calibrations which are rotatable relative to a stationary pointer so that precise movement of the traverse rod may be determined relative to the arm for precisely moving the saw carriage of the conventional radial arm saw in a direction longitudinally of the radial arm thereof and to move the plane of a saw blade thereof into ripping position very precisely in a direction laterally of its plane of rotation. The invention permits an operator to quickly fix the carriage of a radial arm saw in connection with the traverse rod of the invention and them permits the operator to adjust the rod precisely longitudinally of its axis to make a finite adjustment of position of the radial arm saw blade laterally of its plane of rotation.

Accordingly, it is an object of the invention to provide a very simple and easily operable means for accurately adjusting radial arm saw blades in a direction laterally of their axes of rotation when in ripping position.

Another object of the invention is to provide a lateral adjustment means for radial arm saws which is very simple and easy to install on conventional radial arm saws.

Another object of the invention is to provide a novel lateral adjustment for radial arm saws which permits precise adjustment of the plane of a circular saw blade of a radial arm saw laterally of its plane of rotation when in rip position and which does not hamper the normal use of the radial arm saw when in cross-cut position and when the carriage thereof is moved back and forth longitudinally along the radial arm.

Another object of the invention is to provide very a simple adjustment mechanism for the traverse rod thereof which comprises a rotary internally screw-threaded sleeve conformingly containing an externally screw-threaded portion of the traverse rod of the invention; the sleeve being rotatably mounted relative to the radial arm and axially parallel thereto and being restrained in a direction longitudinally of the traverse rod so as to move the rod precisely in a longitudinal direction relative to the radial arm when the internally screw-threaded sleeve is rotated relative to the traverse rod.

Other objects and advantages of the invention may be apparent from the following specification, appended claims and accompanying drawings.

Figure 1:
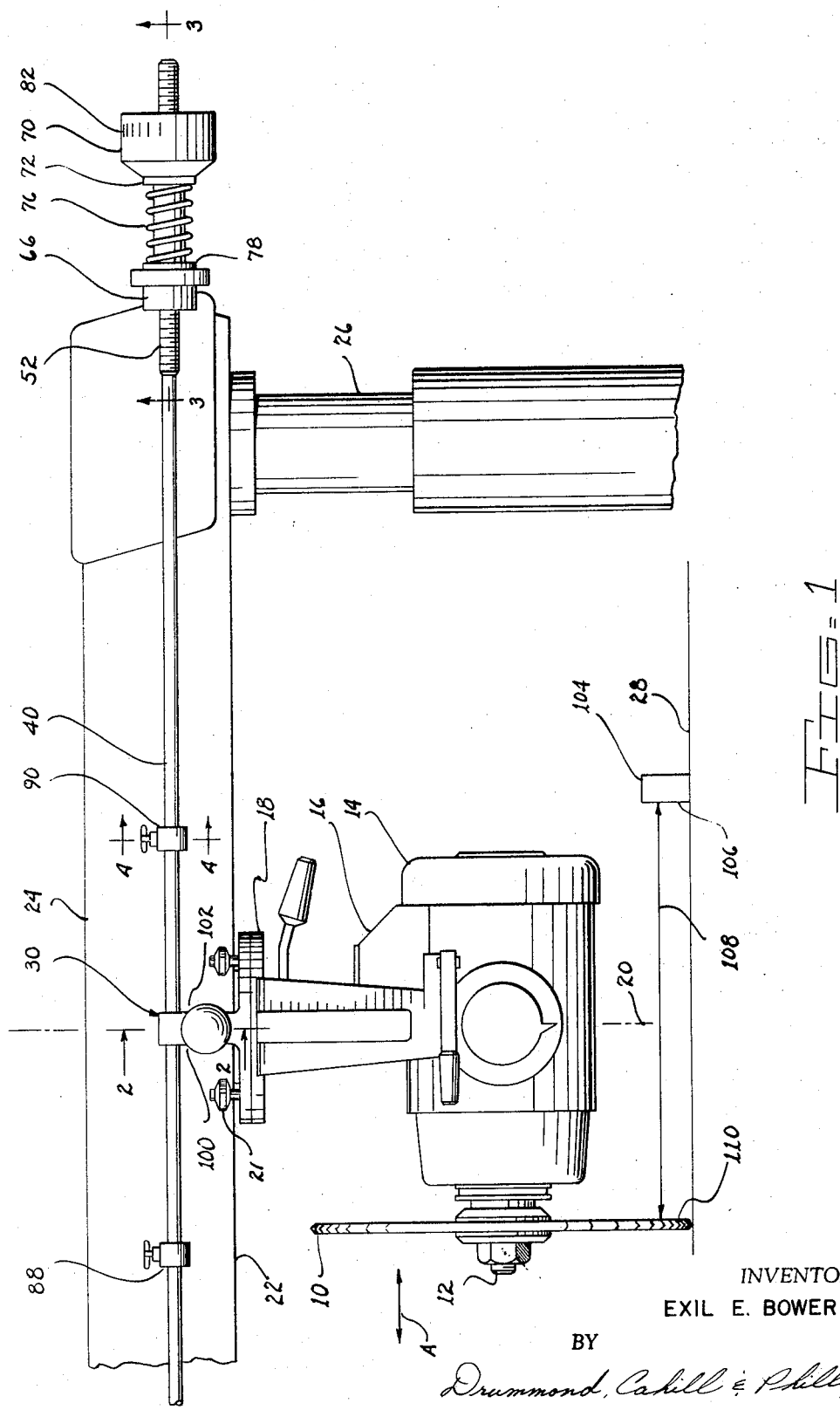
FIG. 1 is a fragmentary side elevational view of a radial arm saw showing the circular saw blade thereof in ripping position and showing the lateral adjustment means of the invention in connection therewith.

As shown in FIG. 1 of the drawings, a radial arm saw is provided with a circular saw blade 10 mounted on a shaft 12 of a motor 14 in connection with a bracket 16 suspended from a carriage 18. The bracket 16 is pivotally movable about a vertical axis 20 in relation to the carriage 18. The carriage 18 is provided with rollers 21 movable on a track portion 22 of a radial arm 24 which is disposed generally in a horizontal cantilever position. This arm 24 is mounted on a vertical stand 26 and the saw blade 10 is thus suspended to operate in close proximity to a table top 28 upon which work may be sawed by the saw blade 10.

All of the foregoing equipment is substantially common to conventional radial arm saws and the invention is particularly adapted to provide for precise adjustment of the plane of the saw blade 10 in directions parallel to the rotating axis thereof as indicated by the double-ended arrow A in FIG. 1 of the drawings and this adjustment as shown in FIG. 1 applies particularly to the saw blade 10 when in ripping position and when the rotating axis thereof is disposed in substantially parallel relation to the radial arm 24.

Figure 2:
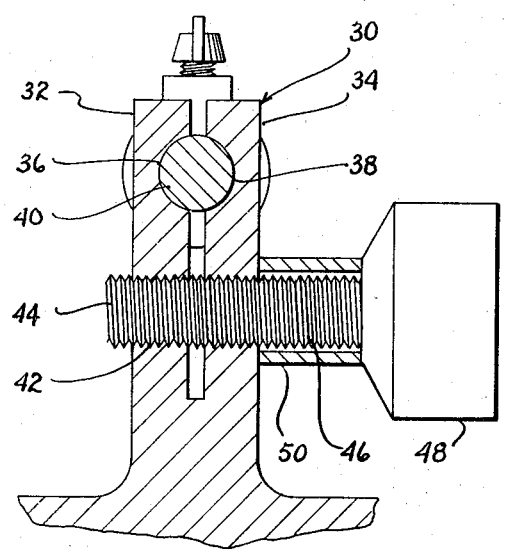
FIG. 2 is an enlarged fragmentary sectional view taken from the line 2—2 of FIG. 1.

Disposed on the carriage 18 of the radial arm saw, is an upstanding clamp means 30 shown best in FIGS. 1 and 2 of the drawings. This clamp means 30 may be the conventional member which contains the locking screw that normally actuates the brake shoe in connection with the radial arm 24 for holding the carriage 18 in juxtaposition longitudinally of the axis of the radial arm 24.

In accordance with the present invention, however, the clamp means 30 may be constructed as shown in FIG. 2 wherein this clamp means 30 is bifurcated into a pair of opposed clamp portions 32 and 34, the portion 32 having a substantially semi-circular portion 36 directly opposed to a similar portion 38 in the bifurcated portion 34. A traverse rod 40 is engaged between the semi-circular in cross section recessed portion 36 and 38 so as to be clamped therebetween.

The clamp portion 32 is provided with an internally screw-threaded bore 42 in which an externally screw-threaded portion 44 of a thumb screw 46 is engaged. This screw 46 is provided with a manually engagable knob 48 which contacts a hollow sleeve 50 and forces it against the clamp portion 34 so as to cause the clamp portions 32 and 34 to firmly engage opposite sides of the traverse rod at the semi-circular in cross section recessed portions 36 and 38 and to thereby fix the clamp means 30 on the traverse rod 40 and to prevent rotation thereof relative to the carriage 18 and the radial arm 24.

It will be seen that the traverse rod 40 is disposed in parallel relation to the radial arm 24 and that when the screw 46 is released by turning it in a counter-clockwise direction that the clamp portions 32 and 34 may be released from the traverse rod 40 and thereby allow the clamp means 30 to slidably move along the traverse rod 40 so that movement of the carriage 18 may be accomplished in the conventional manner for cross-cut operations when the axis of the saw blade 10 is generally at right angles to the radial arm 24.

Accordingly, it will be seen that the clamp means 30 and the traverse rod 40 do not impede normal operations of the radial arm saw.

Figure 3:
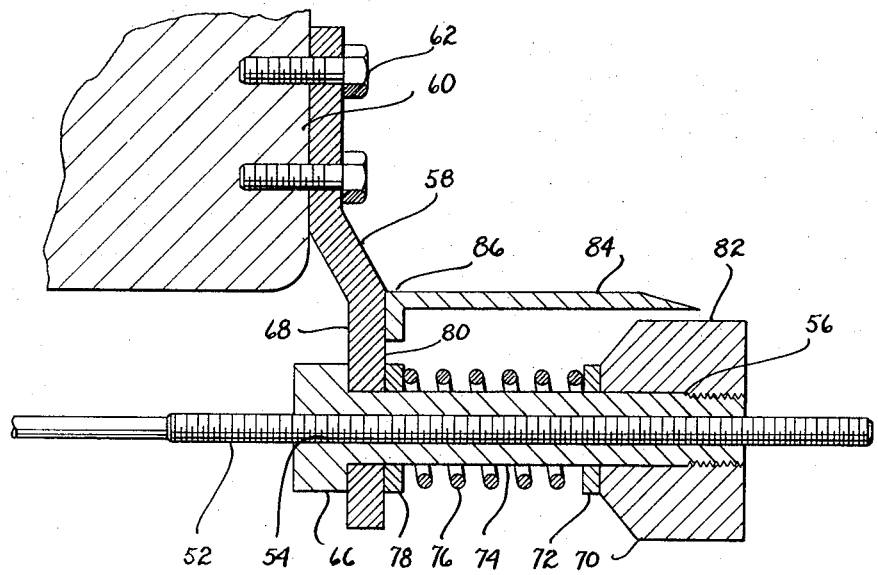
FIG. 3 is an enlarged fragmentary sectional view taken from the line 3—3 of FIG. 1.

The traverse rod 40 is provided with an externally screw-threaded portion 52 as shown best in FIGS. 1 and 3 of the drawings. This externally screw-threaded portion 52 is engaged by internal screw threads 54 of a hollow sleeve 56 which is rotatably mounted in a bracket 58 fixed to the radial arm saw frame structure 60 by means of screws 62. The bracket 58 is provided with an opening 64 in which the sleeve 56 is rotatably mounted. This sleeve 56 is provided with an enlarged diameter portion 66 which abuts one side 68 of the bracket 58 to thereby provide for precise disposition of the sleeve 56 in a direction longitudinally of the axis of the traverse rod 40 as will be hereinafter described in detail.

The sleeve 56 is provided with a manually engagable rotary knob 70 which is fixed on the sleeve 56 and this knob abuts a washer 72 surrounding the periphery 74 of the sleeve. The washer engages a compression spring 76 which, at its opposite end, abuts another washer 78 which is rotatably slidable against a side 80 of the bracket which is opposite to the side 86 precisely engaged by the enlarged diameter portion 66 of the sleeve 56.

The compression spring 76 acts as a detent to hold the washer 78 firmly engaged with the side 80 of the bracket 58 and to thereby prevent rotation of the sleeve 56 when in a desired adjusted position.

The periphery of the knob 70 is provided with dimensional calibrations 82 which may be read adjacent to the end of a pointer 84 as shown in FIGS. 1 and 3 of the drawings. The pointer 84 is fixed at 86 to the bracket 58 and when the knob 70 is rotated, the dimensional calibrations 82 are progressively moved relative to the pointer 84 to indicate a precise longitudinal movement of the traverse rod 40 relative to the bracket 58.

Figure 4:
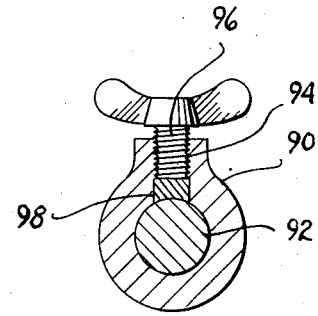
FIG. 4 is an enlarged fragmentary sectional view taken from the line 4—4 of FIG. 1.

As shown in FIGS. 1 and 4 of the drawings, a pair of stop members 88 and 90 are movably mounted on the traverse rod 40.

The stop member 90 is similar to the stop member 88 and, therefore, construction of these stop members will be described in connection with FIG. 4 of the drawings.

The stop member 90 is provided with a bore portion 92 which is normally freely slidable on the traverse rod 40 and disposed at substantially right angles to the bore 92 is an internally screw-threaded bore 94 in which an externally screw-threaded clamp screw 96 is conformingly engaged.

A brake shoe 98 is disposed in the bore 94 and engagable with the periphery of the traverse rod 40, this brake shoe 98 is engaged by the clamp screw 96 for locking the stop member 90 on the traverse rod 40 when the clamp screw 96 is tightened.

Thus, the stop members 88 and 90 may be fixed in various positions longitudinally on the traverse rod 40 and the clamp means 30 as shown in FIG. 1 is provided with respective opposite sides 100 and 102 engagable respectively with the stop members 88 and 90 generally to limit the movement of the carriage 18 to various predetermined locations for disposing the plane of the rotary saw blade in desired positions for duplicating various operations as may be desired.

The stop members 88 and 90 may thus be utilized for repeating various adjustments of the saw blade 10 laterally relative to its axis. However, these stop members 88 and 90 may be removed from the traverse rod or slid to opposite ends thereof out of interference with the clamp means 30 of the carriage 18 when desired.

In operation, the carriage 18 may be moved longitudinally relative to the traverse rod 40 when the screw 46, as shown in FIG. 2 of the drawings, is released and the carriage 18 may be fixed relative to the traverse rod 40 when the screw 46, as shown in FIG. 2, is tightened to cause clamping action of the clamp portions 36 and 38 for fixing the clamp means 30 onto the traverse rod 40 and for fixing the traverse rod 40 against rotation about its axis. Thus the carriage 18 may be moved to any desired position longitudinally of the radial arm 24 and traverse rod 40 when the screw 46 is in release position and this allows the rotary or circular saw blade 10, when in rip position as shown in FIG. 1, to be moved laterally of its plane of rotation in directions according to the double-ended arrow A. When the blade 10 is thus moved to an approximate desired position the screw 46, by means of knob 48, may be tightened causing the clamp means 30 to fix the carriage in relation to the traverse rod 40 and to fix the traverse rod 40 against rotation about its axis. When this is accomplished, fine adjustment of the position of the blade 10 relative to its plane of rotation may be accomplished by rotating the sleeve 56 relative to the bracket 58 and to cause screw-threaded advancement of the traverse rod 40 longitudinally along its axis and to thereby concurrently move the carriage 18 to a precise position for precisely positioning the plane of the saw blade 10 relative to the work on the table 28.

It will be noted that when the sleeve 56 is adjusted the dimensional calibrations 82 on the knob 70 may be rotated into registry with the pointer 84 as shown in FIG. 3 of the drawings to indicate to the operator the attainment of a very precise adjustment. However, the calibrations 82 may not be used since it may be possible visually to adjust the knob 70 until the plane of the circular saw blade 10 is in precise alignment with a desired precise location as related to the work on the table 28.

The spring 76 acts as a detent means for the sleeve 56 and tends to hold it in fixed position relative to the bracket 58 and to prevent rotation of the sleeve 56 after it has been moved to a precisely adjusted position. The spring 76 acting against the washer 78 tends to force the enlarged diameter portion 66 of the sleeve 56 against the side 68 of the stationary bracket 58 and thereby frictionally to lock the sleeve 56 relative to the bracket 58 and to prevent rotation thereof so that the traverse rod 40 is maintained in the desired precision adjusted position.

As shown in FIG. 1 of the drawings, the radial arm saw utilizes a conventional material guide 104 having a side 106 against which material may be positioned.

In accordance with the dimension line 108 of FIG. 1 of the drawings, it will be seen that a plane 110 of the saw blade 10 may be adjusted very precisely relative to the line 108 of the guide 104. This may be done within thousandths of an inch by means of the adjustments provided by the sleeve 56 and the screw-threaded portion 52 of the traverse rod 40 as hereinbefore described. It will be seen that adjustment of the blade 10 may also be accomplished by a precision measuring instrument placed between the plane 110 and the side 106 of the member 104.

It will be understood that the foregoing description of the invention is by way of example only and the various ways in which the invention may be used may vary in accordance with requirements. However, the invention may be constructed as disclosed for the purpose of installing it on conventional radial arm saws now in use or the invention may be designed specifically as a part of new radial arm saws and therefore the specific details of the invention may be varied in accordance with requirements to attain the benefits of the invention in connection with various radial arm saws.

I claim:

1. In a lateral adjustment means for radial arm saws, the combination of:
   a. an elongated traverse rod;
   b. first means for movably supporting said traverse rod on a conventional radial arm saw in substantially parallel disposition to a convention radial arm thereof;
   c. second means for precisely movably adjusting said rod in a longitudinal direction relative to said radial arm and for holding said rod in precisely adjusted position to said arm; said first means comprising external screw threads on said traverse rod; a hollow internally threaded sleeve conformingly engaging said external screw threads on said rod; stationary means rotatably mounting said sleeve; and further means restraining axial movement of said sleeve relative to said stationary means in two directions, longitudinally relative to the rotary axis of said traverse rod;
   d. third means adapted to be fixed to a conventional radial arm saw carriage which is movable longitudinally along said radial arm; and,
   e. fourth means for releasably fixing said third means in connection with said traverse rod whereby said third means and said carriage may be moved along said radial arm and relative to said traverse rod to approximately a desired position, and then said carriage and said third means may be fixed in approximately said desired position by said fourth means and whereby said traverse rod may then be longitudinally adjusted by said second means to a very precise position relative to said first means and said arm and respective saw blade precisely to a desired position laterally with respect to the plane of said saw blade.

2. In a lateral adjustment means for radial arm saws, the combination of:
   a. a radial arm saw having an elongated radial arm;
   b. a carriage movable longitudinally along said arm;
   c. a power saw suspended from said carriage, said power saw adapted to pivot on a vertical axis with respect to said carriage and to thereby move from a cross cut position to a rip position;
   d. an elongated traverse rod;
   e. first means supporting said traverse rod in parallel relation to said radial arm;
   f. second means stationarily mounted with respect to said radial arm and adapted for precisely movably adjusting said rod in a longitudinal direction relative to said radial arm and for holding said rod in precisely adjusted position relative to said arm; said first means comprising external screw threads on said traverse rod; a hollow internally threaded sleeve conformingly engaging said external screw threads on said rod; stationary means rotatably mounting said sleeve; and further means restraining axial movement of said sleeve relative to said stationary means in two directions, longitudinally relative to the rotary axis of said traverse rod.

3. The invention as defined in claim 1 wherein said second means comprises:
   a. external screw threads on said traverse rod;
   b. a hollow internally screw-threaded sleeve conformingly engaging said external screw threads on said rod;
   c. said sleeve rotatably mounted relative to said first means and precisely restrained in a direction axially relative to said sleeve and said rod; said first means comprising a stationary member having first and second opposite sides and having an opening therein; said sleeve rotatably mounted in said opening; said sleeve having a fixed enlarged diameter structure thereon and rotatably mounted and disposed adjacent said stationary member at said first side thereof and thereby axially restrained thereagainst; a compression spring having first and second ends and surrounding said sleeve; a washer disposed between said first end of said spring and said second side of said stationary member; means fixed to said sleeve and holding said second end of said spring compressibly against said washer; and manually engageable means secured to said sleeve for manually rotating it.

4. The invention as defined in claim 1 wherein:
   a. said third means is freely slidably mounted on said rod;
   b. said fourth means comprising manually operable screw-threaded clamp means adapted to fix said third means on said rod.

5. The invention as defined in claim 1 wherein stop means is movably mounted on said rod and adapted to be fixed to said rod, said stop means being adapted to provide interference stops for said carriage as it is moved longitudinally along said radial arm and with respect to said traverse rod.

6. The invention as defined in claim 1, wherein:
   a. said second means comprises external screw threads on said traverse rods;
   b. a hollow internally screw-threaded sleeve conformingly engaging said external screw threads on said rod;
   c. said sleeve being rotatably mounted relative to said first means and precisely restrained in a direction axially relative to said sleeve and said rod; and,
   d. detent means for holding said sleeve in adjusted position relative to said first means and said radial arm; said first means comprising a stationary member having first and second opposite sides and having an opening therein; said sleeve rotatably mounted in said opening; said sleeve having a fixed enlarged diameter structure thereon and rotatably mounted and disposed adjacent said stationary member at said first side thereof and thereby axially restrained thereagainst; a compression spring having first and second ends and surrounding said sleeve; a washer disposed between said first end of said spring and said second side of said stationary member; means fixed to said sleeve and holding said second end of said spring compressibly against said washer; and manually engageable means secured to said sleeve for manually rotating it.

7. The invention a defined in claim 1 wherein:
   a. said second means comprises external screw threads on said traverse rod;
   b. a hollow internally screw-threaded sleeve conformingly engaging said external screw threads on said rod;
   c. said sleeve rotatably mounted relative to said first means and precisely restrained in a direction axially relative to said sleeve and said rod;
   d. means for holding said sleeve in adjusted position;
   e. dimensionally calibrated means on said sleeve;

f. a pointer disposed stationarily relative to said calibrated means.

* * * * *